UNITED STATES PATENT OFFICE.

EARL COLLINS CARPENTER, OF SAN ANTONIO, TEXAS.

DIP FOR ANIMALS.

1,071,507.  Specification of Letters Patent.  Patented Aug. 26, 1913.

No Drawing.  Application filed April 22, 1912. Serial No. 692,524.

*To all whom it may concern:*

Be it known that I, EARL C. CARPENTER, a citizen of the United States, residing at San Antonio, in the county of Bexar and State of Texas, have invented certain new and useful Improvements in Dips for Animals, of which the following is a specification.

My invention relates to a dip for the cure of mange, Spanish itch, and kindred skin diseases prevalent among animals.

The object of the invention is to provide a non-poisonous antiseptic and parasiticide dip which stimulates the growth of hair or wool.

Generally speaking, my invention consists in making a saturated solution of caustic potash, adding sulfur which will thus be reduced to a liquid, then diluting with water and filtering, and finally adding wood alcohol. This produces a strong caustic alkaline solution which is subsequently mixed with water and a neutralizing agent, as sulfuric acid.

In practice, I take two and one-half pounds caustic potash (American), three pounds of sulfur, sufficient water to make about five pints, and after the mixture is allowed to cool and then filtered, I add one pint of wood alcohol. By using one ounce of this solution in fifty ounces water (preferably, soft water) the alkaline solution is secured, and upon adding about one dram of sulfuric acid (C. P.) the reaction will be rendered neutral.

The maximum benefit from the sulfur and alcohol remaining is secured by neutralizing the solution of alkaline sulfid. Besides stimulating and promoting the growth of hair or wool, the solution thus produced is efficacious as an antiseptic and parasiticide and, being neutral in reaction, is non-poisonous.

It should be understood that in broader aspects my invention comprehends the employment not only of the ingredients described, but of equivalent ingredients for obtaining the desired results. For example, instead of caustic potash I may use impure carbonate of potash.

It is desired to reserve the right to effect such changes in the proportions of ingredients used as may come fairly within the scope of the appended claim.

What is claimed, is:—

The herein described process of making a dip for animals, consisting in making a saturated solution of caustic soda, adding sulfur, diluting with water and filtering, adding wood alcohol, water and sulfuric acid.

In testimony whereof I hereunto affix my signature in presence of two witnesses.

EARL COLLINS CARPENTER.

Witnesses:
 WINK W. WEAVER,
 WM. LENETT.